United States Patent [19]

Neiheisel et al.

[11] Patent Number: 4,893,933
[45] Date of Patent: Jan. 16, 1990

[54] AUTOMATIC BOF VESSEL REMAINING LINING PROFILER AND METHOD

[75] Inventors: Gary L. Neiheisel, Cincinnati; Karl T. Bagdal, Middletown; Bradley R. Hoover, Hamilton; Robert H. Jacks, Middletown, all of Ohio

[73] Assignee: Armco Inc., Middletown, Ohio

[21] Appl. No.: 103,069

[22] Filed: Sep. 30, 1987

[51] Int. Cl.$^4$ ............................................. G01B 11/02
[52] U.S. Cl. ....................... 356/376; 356/1; 356/381
[58] Field of Search ............. 356/1, 4, 375, 376, 356/381

[56] References Cited

U.S. PATENT DOCUMENTS

| | | | |
|---|---|---|---|
| 4,025,192 | 5/1977 | Scholdstrom et al. | 356/141 |
| 4,107,244 | 8/1978 | Ochiai et al. | 264/30 |
| 4,172,661 | 10/1979 | Marcus et al. | 356/141 |
| 4,218,989 | 8/1980 | Fujita et al. | 118/713 |
| 4,227,802 | 10/1980 | Scholdstrom | 356/381 |
| 4,248,532 | 2/1981 | Nosler | 356/1 |
| 4,248,809 | 2/1981 | Sakai et al. | 264/30 |
| 4,301,998 | 11/1981 | Rodway | 266/281 |
| 4,331,975 | 5/1982 | Krawza et al. | 356/1 |
| 4,373,804 | 2/1983 | Pryor et al. | 356/1 |
| 4,373,805 | 2/1983 | Mallinson | 356/1 |
| 4,522,492 | 6/1985 | Masunaga | 356/1 |

FOREIGN PATENT DOCUMENTS

| | | | |
|---|---|---|---|
| 121617 | 10/1984 | European Pat. Off. | 356/376 |
| 2945251A1 | 11/1979 | Fed. Rep. of Germany . | |
| 2343996 | 11/1977 | France . | |
| 190607 | 10/1984 | Japan | 356/376 |
| 29710 | 2/1986 | Japan | 356/376 |
| 194304 | 8/1986 | Japan | 356/376 |
| 2020418 | 11/1979 | United Kingdom . | |

OTHER PUBLICATIONS

"AGA IMS 1600 Measuring System–System Description", Optimization of BOF Lining Life, B. A. Otterman and R. D. Borthwick, Jun. 1984, I&SM.

"Accurate Lining Wear Control Through Laser Technology", K. Nilsson, Sep. 1981, Iron and Steel Engineer.

Primary Examiner—Richard A. Rosenberger
Attorney, Agent, or Firm—Frost & Jacobs

[57] ABSTRACT

Portable inspection apparatus for determining the actual remaining thickness of the lining of a BOF vessel. The apparatus is mounted on a portable cart which can be wheeled into close proximity with the open top of a horizontally disposed furnace vessel. A laser transmitter directs a laser light beam toward the furnace lining. The light beam scattered from the vessel lining is received by a self-scanned linear array and correlated by means of a computer to provide a graphical representation of actual remaining lining thickness.

Pneumatically operated locating members cooperate with positioning pads in the floor adjacent the vessel to accurately and repeatably position the cart with respect to the furnace coordinates. The inspection apparatus is also provided with computer processing to automatically scan a preselected area of the vessel lining less than the entire area in order to monitor lining locations of high potential wear. The processing also calculates the height of the molten metal for accurately positioning an oxygen lance.

27 Claims, 10 Drawing Sheets

AUTOMATIC BOF VESSEL REMAINING LINING PROFILER AND METHOD

BACKGROUND OF THE INVENTION

1. Field of the Invention

The present invention relates generally to automatic inspection equipment, and more particularly to a portable laser-based inspection system for automatically scanning the interior surface of a refractory lined vessel in order to determine the wear characteristics of the vessel lining. The invention may also be used to inspect the interior of vessels which have been allowed to fully or partially cool as well as the interior of other types of vessels such as electric furnaces, ladles and the like. The vessel can be of the type used to contain ferrous, nonferrous or other molten materials.

In one process for making steel, molten iron, with a high carbon content, is refined in a basic oxygen furnace (BOF) by blowing oxygen into the molten iron from the top of the furnace vessel by means of a water-cooled lance. This is a violent exothermic process which results in erosion of the lining of the furnace vessel.

The lining in this type of BOF vessel generally consists of an approximately three foot thick layer of ceramic brick inside a steel shell. This refractory material protects the steel wall of the furnace shaped vessel from the about 3,000° F. (1650° molten steel during the refining process. The refractory brick lining eventually wears away due to the constant bombardment from scrap charging and the corrosive nature of the molten steel-slag combination.

To prevent removing the vessel from operation to repair worn brick, it is common practice to spray a refractory slurry on the damaged areas of the vessel between heats. In using this repair process, it is important to know the topography of the vessel lining to guide the repair process. This may be accomplished by measuring the surface topography of the interior wall of the vessel at a particular point in time, measuring the topography of the interior wall surface at a subsequent time, and comparing the differences to determine the change in thickness of the vessel refractory lining.

In many instances, the carbon content of the steel and the temperature required for a particular steel chemistry are achieved by top-blowing oxygen through a lance, the lower end of which is positioned a predetermined distance above the upper surface of the liquid steel bath. If the lance is positioned too low, lance life is adversely affected. Conversely, if the lance is positioned too high, steel quality and yield are adversely affected.

In addition, many BOF vessels utilize bottom stirring wherein inert gasses are blown through tuyeres installed in the refractory lining. The use of such bottom stirring methods has generally made the conventional methods of measuring steel bath height within the vessel unreliable. For example, one typical method for measuring bath height involves inserting a metal rod into the molten bath and measuring the remaining length after the portion in the bath is melted. However, where bottom stirring is utilized, the turbulence created by the bottom stirring gasses generally makes this measurement technique unreliable.

As is well known, steel bath level depends not only on the quantity of material charged into the vessel, but also on the topography of the refractory lining. The present invention also includes means for accurately and quickly determining the level of the molten steel bath in the absence of stirring gasses. In the preferred embodiment to be described in more detail hereinafter, this is accomplished by determining the coordinates of a number of points on the refractory surface inside the vessel, and calculating from these points the interior volume of the vessel as a function of steel bath height. The unstirred or flat bath level can then be determined as a function of steel charge weight.

2. Description of Related Art

One type of measurement device for determining the wear characteristics of the interior lining of the furnace vessel is described in U.S. patent application Ser. No. 560,915 entitled "Apparatus for Measuring Wear in the Lining of Refractory Furnaces", filed Dec. 13, 1983, and assigned to the assignee of the present application. That system uses a laser triangulation system where a laser beam is directed at the hot refractory wall. Scattered laser radiation is then collected by a lens and focused on a linear array of photodiodes in a self-scanned camera. The address of the diode where the image of the laser spot is focused is proportional to the distance to the refractory wall. As the wall distance varies, so does the location of the laser image on the array. A narrow bandpass interference filter is used to detect only the laser wavelength, while ignoring the background radiation emitted by the hot wall. The distance to the vessel wall can then be correlated via a computer with the actual remaining lining thickness.

This type of scanning system is lowered into the hot furnace vessel at the end of a water-cooled lance. The vessel is in a vertical orientation for this inspection. The sensor then mechanically scans the inside of the vessel for damaged areas. The lance rotates through 360° and indexes up or down to enable a complete mapping of the vertical walls of the vessel. This type of system may be controlled by an operator's console in the pulpit.

For environmental reasons, however, many furnace vessels are provided with an overlying collection hood or fume scrubber which collects fumes and gases issuing from the open top of the furnace vessel. Consequently, a vertical entry laser inspection system is impractical for these types of installations.

One prior art system designed to inspect this hooded type of furnace vessel is described in U.S. Pat. No. 4,508,448 entitled "Apparatus For Measuring The Distance To A Point On The Inner Wall Of A Hot Furnace". This system uses a laser time of flight phase measurement technique to determine the wall position. The system is totally manual in that it requires measurement of building and vessel reference points, which requires a substantial set-up time. In addition, once the unit is positioned, the operator must manually move the head to direct the laser beam to each point on the lining to be measured and then focus the head on that point. This requires a substantial amount of time to take each reading. Typically, 45 minutes to 1 hour is required to completely inspect the interior of a vessel using this type of system. In addition, this type of system may lack sufficient environmental controls so that the unit cannot be positioned sufficiently close to the open top of the still hot horizontally disposed furnace vessel. While this can be overcome somewhat by placing the unit further back from the furnace, the measurable field of view within the vessel is significantly reduced. Further, this type of system only produces a series of points along one vertical section or "slice" of the interior of the furnace vessel. Consequently, there is lacking much information about the interior contour of the vessel.

SUMMARY OF THE INVENTION

The present invention is directed to an improved laser refractory measurement system specifically adapted for use in non-vertically oriented vessel inspections. The laser measurement system is positioned on a mobile cart. The vessel is rotated on its trunnions to a horizontal position. The cart is then rolled from its garage and positioned adjacent the front of the vessel. The cart is then positioned over locating pads mounted in the floor. The operator activates pneumatic cylinders located on the sides and rear of the cart to raise the cart to a reference position which is well known with respect to the vessel axis. This insures that the cart is positioned reproducibly each time with respect to the vessel. With this type of arrangement, the necessity of measuring or "shooting" reference positions with respect to the building containing the furnace vessel is eliminated.

Once positioned, the laser inspection system automatically scans the interior of the furnace vessel with a predetermined scan sequence. The desired scan routine is preprogrammed to efficiently cover the desired area for inspection. For example, particular areas of known high wear can be selected for inspection without the necessity of scanning the entire interior of the furnace vessel. Such areas may include the left and right trunnions, the charge pad, the tap pad, the full bottom, and the bottom tuyere areas. These areas can be scanned in a fine, medium or coarse resolution. In particular, bottom scanning provides essential information for vessels using bottom stirring techniques.

Once the scan has been completed, a topographical output map is generated showing the inspected area in a two dimensional representation with contour lines of equal remaining lining thickness. The actual thickness is listed in inches on the plot. Depending on the density of points desired, the inspection can be completed in 5–10 minutes, garage-to-vessel-to-garage.

Environmental control of the cart is achieved by appropriate sealing, fans, insulation, temperature monitoring, and internal cooling to insure that the cart and its associated mechanical and electronic equipment can withstand the high temperatures immediately in front of the still hot horizontally disposed furnace vessel.

Further features of the invention will become apparent from the detailed description which follows.

DESCRIPTION OF THE PREFERRED EMBODIMENTS

Figure 1:
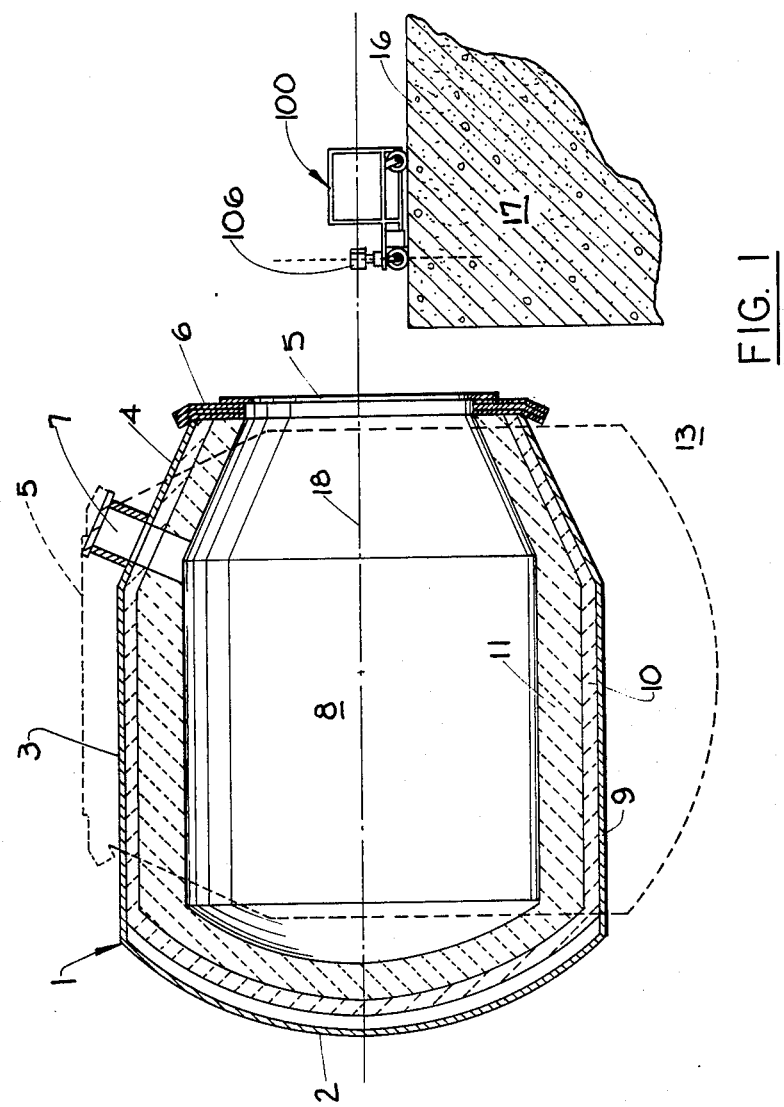
FIG. 1 is a fragmentary partially cross sectional diagrammatic view of the inspection apparatus of the present invention positioned adjacent the open end of a horizontally disposed BOF vessel.

A typical BOF vessel is illustrated generally at 1 in FIG. 1, and is shown rotated to a substantially horizontal position from a normal vertical melting position as will be described in more detail hereinafter. As is well known in the art, vessel 1 is composed of a generally rounded bottom 2 surmounted by a cylindrical barrel or body section 3. The upper portion of body 3 narrows inwardly in the cone section 4. The interior surface of the barrel section 3 opposite the tap hole 7 is generally referred to as the charge pad. The uppermost end of cone section 4 is provided with a round opening 5 permitting the charge to be introduced into the furnace vessel. The perimeter of opening 5 may be provided with a reinforced lip as at 6. A tap hole 7 extends angularly through the side wall of the cone section 4 and communicates with the interior 8 of the furnace vessel. The interior surface of the barrel section 3 immediately below tap hole 7 is generally referred to as the tap pad.

The wall of vessel 1 is formed from three concentrically positioned shells. The outermost shell 9 is generally fabricated from steel and provides the mechanical integrity for the furnace vessel. A safety lining 10 is provided immediately inwardly adjacent the steel shell 9. Typically, safety lining 10 will be fabricated from fired magnesite brick. Finally, the innermost working lining 11 is typically fabricated from pitch-impregnated magnesite brick in the cone section 4 and tempered pitch-bonded magnesite brick in the bottom section 2. Together, safety lining 10 and working lining 11 are approximately three feet thick and protect the steel wall or shell 9 of the furnace vessel from the 3000° F. (1650° C.) molten steel during the refining process.

In typical operation, the refractory brick forming working lining 11 eventually wears or erodes away due to the constant bombardment from scrap charging and the corrosive nature of the molten steel-slag combination. In general, the lining does not wear evenly, but some areas which are subjected to more abuse may show higher wear. For example, the interior area of the trunnions generally represents a critical area of refractory erosion. Unlike the bottom, which can be built up with slag after tapping, the trunnions 12 can be protected only by gunning with a refractory material. Consequently, it is important to know the wear characteristics of these critical areas wherein wear may not be immediately apparent by mere visual inspection.

For example, without spraying, an initial working lining thickness of about 36 inches (1 meter) would erode to the safety lining in the trunnion area after perhaps 800 heats. Intensive application of spray material on the worn areas extends the vessel lining campaign. By carefully monitoring the wear of selected areas of the interior of the furnace vessel, the working lining can be patched with refractory gunning material between heats to extend the time when the entire working lining must be replaced. Commonly, to minimize the erosion of the lining, spray material is applied to the internal trunnion area approximately every third heat.

In usual operation, furnace vessel 1 is positioned vertically in the refining position so that the open top 5 is located at the uppermost part of the vessel as illustrated by the dashed line position in FIG. 1. Commonly, the open top of the vessel is covered by an overlying collection hood or fume scrubber (not shown) which collects fumes and gases issuing from the open top of the furnace vessel, and prevents them from being discharged directly into the atmosphere. Because the open top of the vessel is often covered, it is impractical to use a lining inspection device which must be lowered into the vessel through the open top as previously described.

Figure 3:
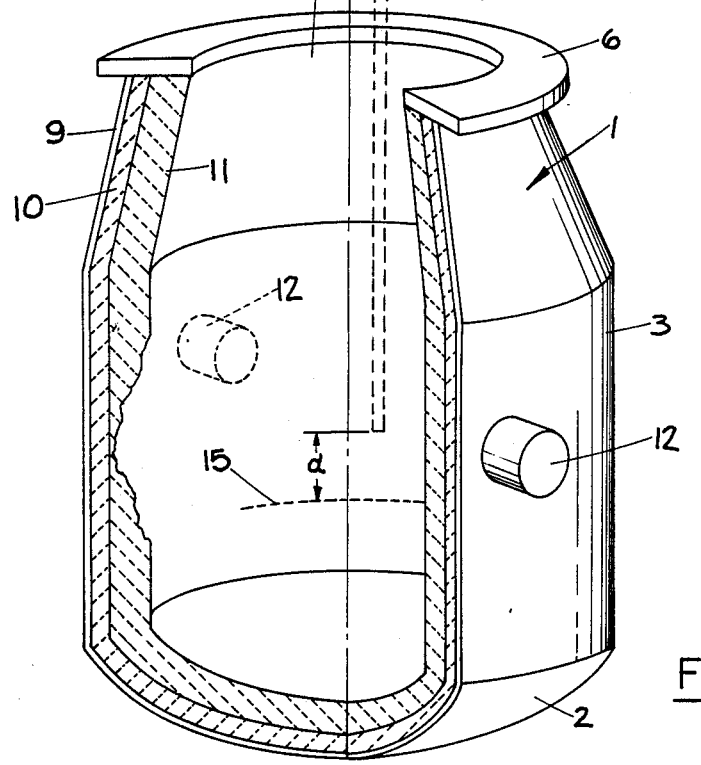
FIG. 3 is a partially cross-sectioned elevational view of a typical BOF vessel illustrated in a vertical orientation.

As best shown in FIG. 3, vessel 1 may also be provided with outwardly extending trunnions 12 mounted on each side of the body portion 3. Trunnions 12 are supported by means not shown to permit the entire furnace vessel to pivot from the vertical melting position shown in dashed lines in FIG. 1 to the horizontal inspection position shown in solid lines. It will be observed from FIG. 1 that the furnace vessel is often mounted overlying a pit-like area 13 beneath the vessel structure to provide clearance for the pivoted vessel.

In many instances, the carbon content of the steel and the temperature required for a particular steel chemistry are achieved by top-blowing oxygen through a lance designated diagrammatically as 14 in FIG. 3, the lower end of which is positioned a predetermined distance d above the upper surface of the liquid steel bath, shown diagrammatically at 15 in FIG. 3. In general, it is crucial to know the actual position of the lower end of lance 14 in order that the lance not contact the upper surface of the steel bath, which could cause breaking or damage to a lance, and to provide the correct amount of oxygen penetration into the molten steel bath. As noted hereinabove, the actual steel bath level is affected by the turbulence caused by inert gasses used in bottom stirring. Consequently, the actual bath level may change from point to point and from time to time during each heat.

The present invention is directed to inspection apparatus which is preferably portable and which can be positioned in front of the open top of the horizontally oriented vessel, which may be a melting furnace or a ladle, to automatically scan all or a selected portion of the interior lining of the vessel to provide a comprehensive graphical representation of the remaining lining thickness to facilitate repair as previously described.

In a preferred embodiment, the inspection apparatus, shown generally in FIG. 1 at 100, is positioned on the flat floor 16 of raised platform 17 immediately in front of the open end 5 of BOF vessel 1 in the horizontal inspection position. As will be described in more detail hereinafter, inspection apparatus 100 is preferably positioned on the horizontal and vertical centerline 18 of the vessel which has been rotated from the normal vertical melting position to the horizontal position illustrated in FIG. 1. It will be understood that while the contents of the vessel have been discharged, except for remaining slag, the interior of the vessel is still at an extremely high temperature, typically 1300° C. (2370° F.). Moreover, it is highly desirable from an energy conservation standpoint to be able to inspect the interior of the vessel while it is still hot, rather than allowing the vessel to cool, with the resulting loss of production capability during that down-time. In any event, at these temperatures, it is generally impossible for anyone to stand directly in front of the vessel opening without a thermally protective barrier.

Figure 5:
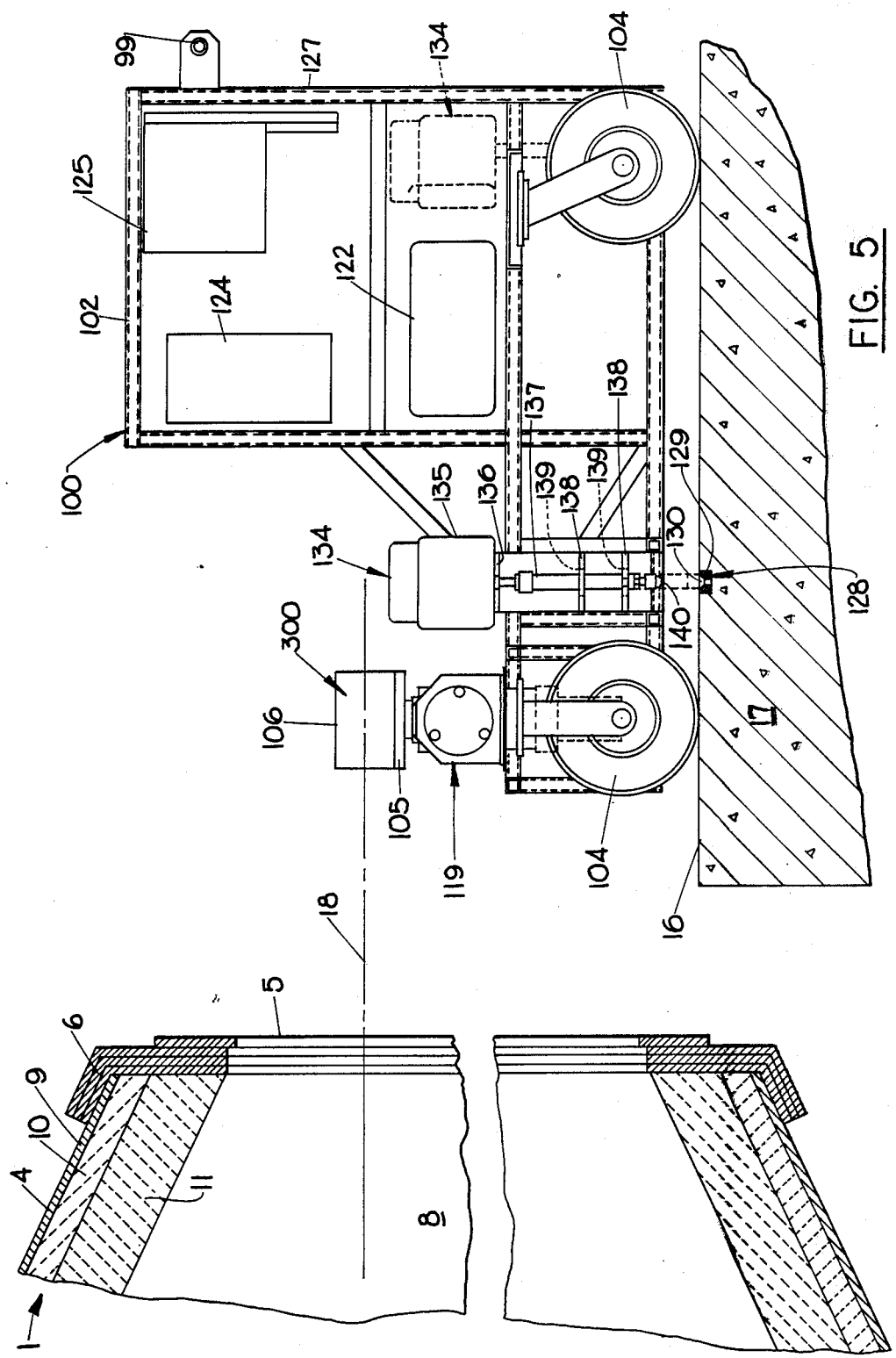
FIG. 5 is a fragmentary partially cross-sectioned side elevational view showing the inspection apparatus in more detail from that shown in FIG. 1.
Figure 6:
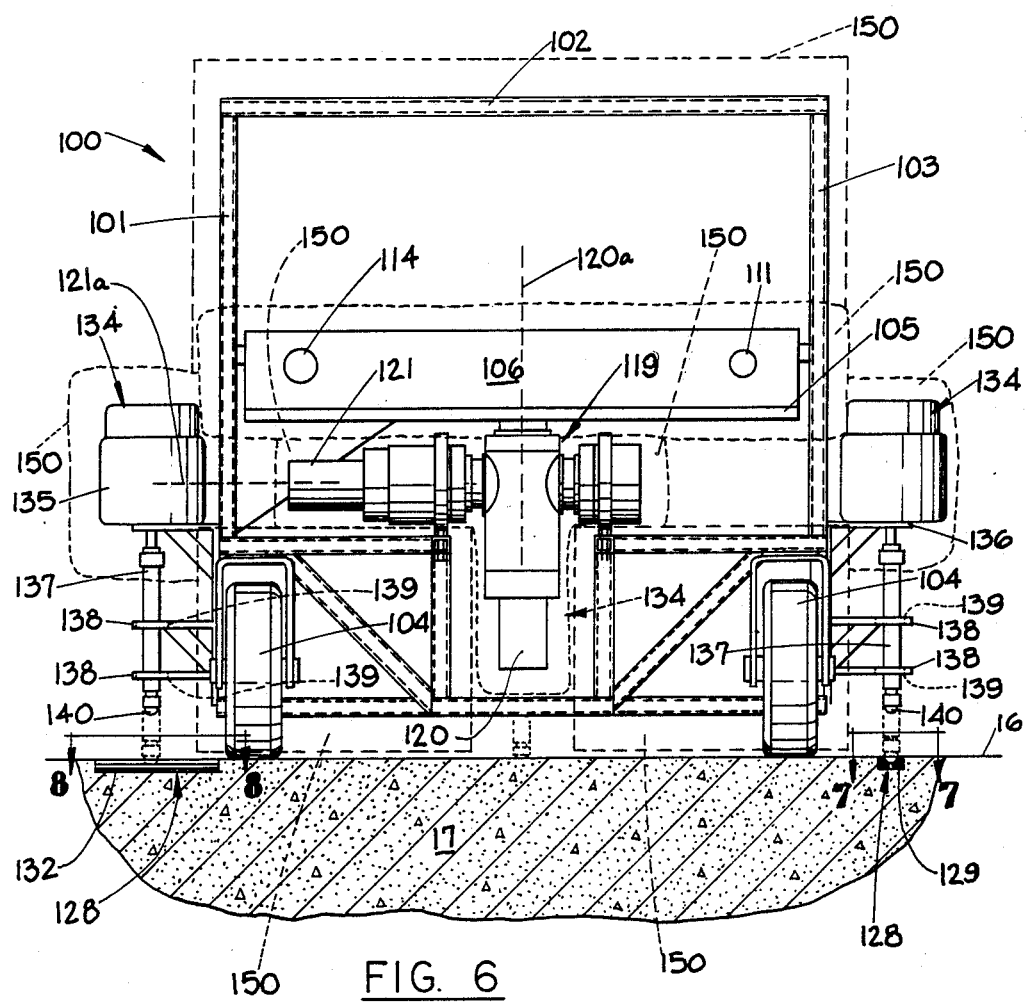
FIG. 6 is a fragmentary partially cross-sectional front elevation view of the inspection apparatus of the present invention.
Figure 7:
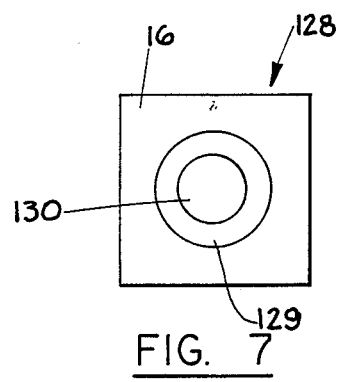
FIG. 7 is a plan view of a portion of the inspection apparatus of the present invention taken along section line 7—7 of FIG. 6.
Figure 8:
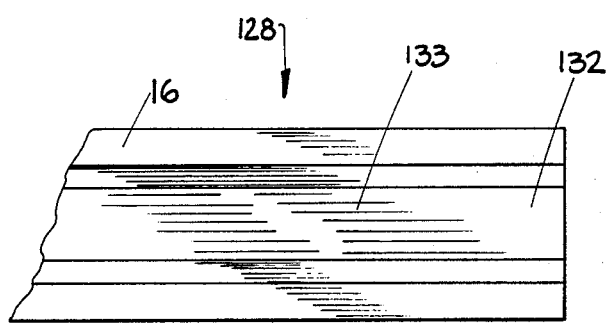
FIG. 8 is a fragmentary plan view of a portion of the inspection apparatus of the present invention taken along section line 8—8 of FIG. 6.
Figure 9:
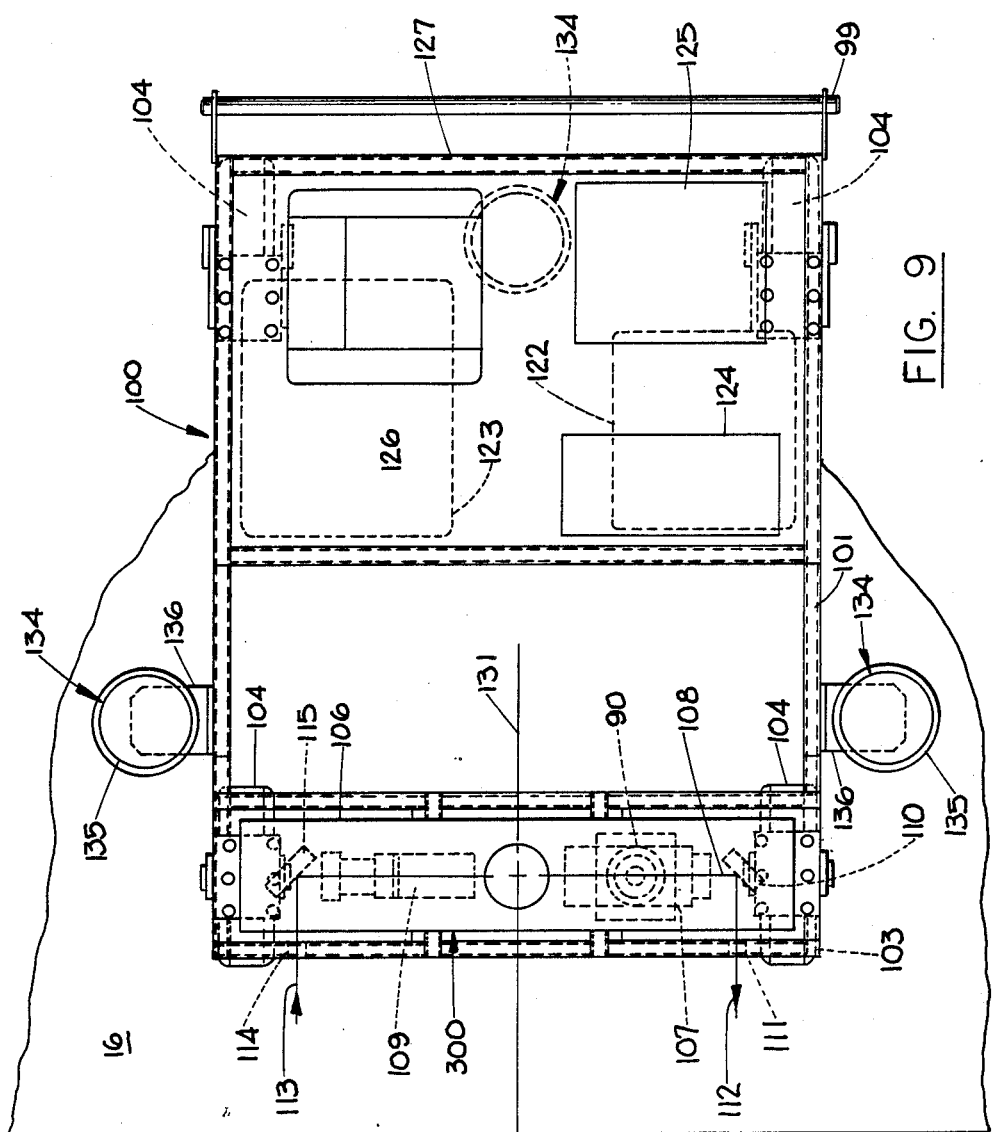
FIG. 9 is a fragmentary partially cross-sectioned top plan view of the inspection apparatus of the present invention shown located adjacent the open top of a horizontally disposed furnace vessel.
Figure 9:
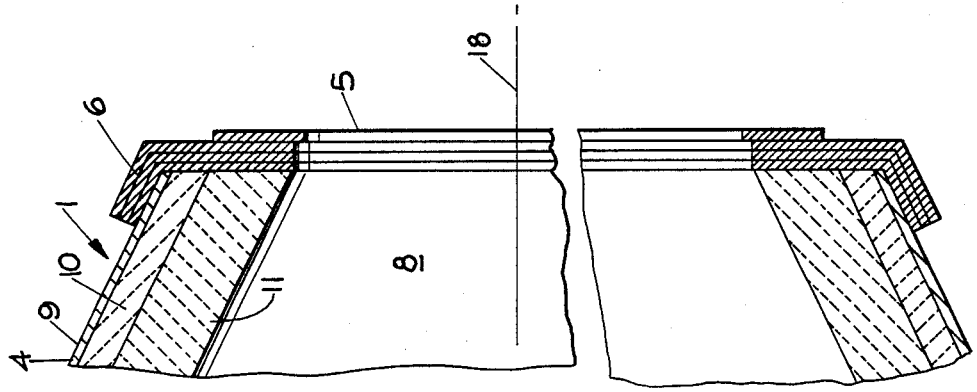

As can best be seen in FIGS. 5, 6 and 9, inspection apparatus 100 comprises a portable wheeled cart-like structure 101 which mounts the actual laser inspection devices and environmental control systems. In the preferred embodiment illustrated, cart 101 is composed of a frame 102 formed from a plurality of structural members, one of which is shown at 103, which may be attached together by welding or the like. The cart is provided with wheels 104 by which the entire cart may be rolled into position at a preselected location on platform floor 16. The rear of cart 101 is provided with a horizontally extending push handle 99 by which the cart may be steered and directed into position.

The forwardmost portion of cart 101 is provided with a gimballed platform 105 which mounts an enclosure 106 containing the laser inspection system 300 of the present invention. As more specifically illustrated in FIG. 9, for example, the laser inspection system 300 is made up of a laser transmitter 107 which emits a collimated laser light beam 108, and a laser light beam receiver, indicated generally at 109, together with the associated processing electronics to be described.

Laser transmitter 107 is mounted transversely to longitudinal axis of cart 101 such that laser light beam 108 is directed toward an angularly mounted mirror 110. The laser light beam reflected from mirror 110 is then directed toward the front of the cart and passes through a round opening 111 in the front face of enclosure 106. The emerging laser beam is then directed toward opening 5 of the furnace vessel as indicated by directional arrow 112. For purposes of an exemplary showing, laser transmitter 107 may be an argon ion laser which emits coherent radiation at a wavelength of 4880Å. It has been found that utilizing a shorter wavelength, particularly with the argon ion laser, permits measurements to be made of hotter vessel walls, and tends to reduce interference from background radiation.

However, it will be understood that the laser transmitter 107 may also be of any other conventional type such as HeNe, HeCd, etc. In addition, laser units producing light beams of different wavelengths may be used to inspect different types of furnaces, depending upon the wall temperatures involved. For example, as described in U.S. patent application Ser. No. 560,915, a 9mW hard-seal helium-neon laser producing an output at 6328Å has been found to produce good results when used to illuminate the interior of furnace vessels having a wall temperature of about 1100° C. (2010° F.).

Receiver 109 is also mounted transversely to the longitudinal axis of cart 101 as best shown in FIG. 9, and may comprise a self-scanned linear array receiver such as a Reticon Model LC 110 HEU-011 1024 element self-scanned linear array sensor which is utilized as will be described hereinafter.

The laser beam reflected or scattered from the interior wall of the furnace vessel illustrated at 113 in FIG. 9 passes through an opening 114 in the front of enclosure 106, and is reflected by an angularly mounted mirror 115 onto receiver 109.

Figure 2:
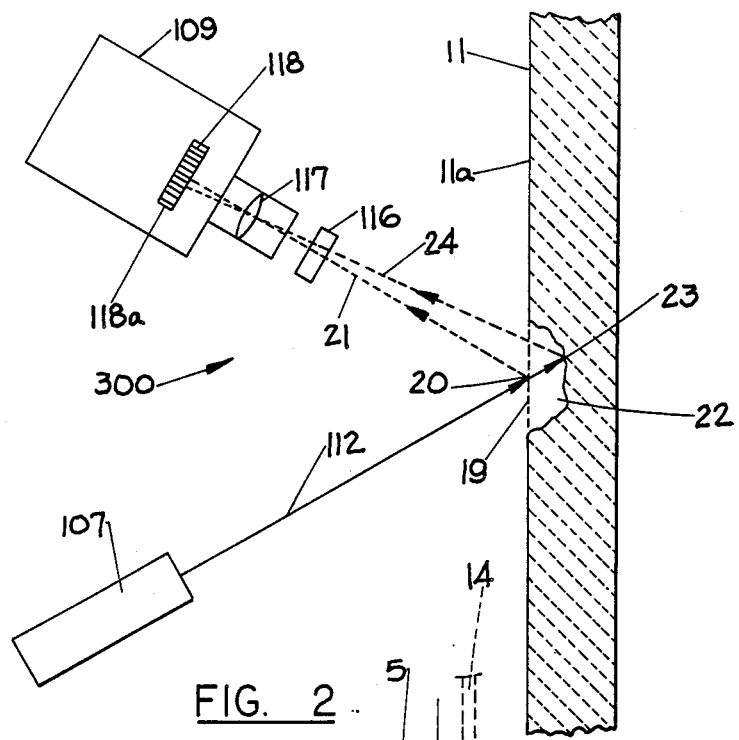
FIG. 2 is a schematic diagram of the laser inspection system associated with the inspection apparatus of the present invention adjacent to a partially worn furnace vessel wall.

FIG. 2 illustrates diagrammatically the laser triangulation technique used in the preferred embodiment of the present invention to detect irregularities in the interior furnace vessel wall utilizing the laser transmitter and receiver just described. It will be understood in this diagram that the reflecting mirrors have been deleted for clarity. Elements similar to those previously described have been similarly designated.

Laser transmitter 107 directs the incident laser light beam 112 toward the interior surface 11a of furnace vessel wall 11. When the topography of the original lining surface 19 is scanned, the incident laser light beam will strike the inner surface at a point 20 and be reflected along nominal reflectance path 21. However, in the event that the lining contains a worn or damaged area as at 22, the incident laser light beam 112 will strike the damaged area at a point 23 and be scattered along a different path 24. It will be understood that an electrically operated shutter (not shown) may be placed in front of the laser transmitter as a safety precaution to avoid potential eye damage from the raw laser beam.

The scattered laser light beam is directed through an optical filter 116 which is designed to be optically responsive only to the wavelength associated with the laser beam produced by laser transmitter 107. Since the laser transmitter produces an output having a wavelength of 4880Å, optical filter 116 may be provided with a relatively narrow bandpass of about 4880Å±5Å. Means not shown may also be provided for controlling the temperature of the optical filter to ensure that the passband does not drift or change with temperature.

The scattered laser beam is then focused by means of focusing lens 117 on the self-scanned linear array elements 118 associated with receiver 109. Array 118 comprises a plurality of optical elements, one of which is shown at 118a, lying along a linear axis. Each of the optical elements produces an electrical signal output in response to the scattered laser light beam falling on that element.

Generally, array 118 will be positioned so that the normal or nominal reflected laser light beam scattered from an undamaged portion of the wall strikes one or more elements of the array. In the event the lining is damaged or worn, the laser light beam will be scattered along a different path 24 and will strike different elements of the self-scanned linear array. Conversely, in the event there is a built-up area on the furnace lining wall, the scattered laser light beam will be displaced in the opposite direction to different array elements. Consequently, the amount of displacement of the scattered laser light beam as determined by the particular array elements impinged upon by the beam provides an indication of the relative distance to the vessel lining wall. Using an appropriate computer, this displacement can be correlated with the actual remaining lining thickness, as described in U.S. application S.N. 560,915, for example, the disclosure of which is incorporated herein by reference.

In the preferred embodiments of the present invention, various geometrical relationships may be utilized among the optical elements of the laser inspection system. For example, in one embodiment, the optical elements of the self-scanned linear array may be arranged so as to lie in the same plane as the laser transmitter axis, and the linear array receiver may be positioned substantially perpendicular to the optical axis of the focusing lens, as described in more detail in U.S. application S.N. No. 560,915, the disclosure of which is incorporated herein by reference.

Alternatively, the optical elements may be arranged so as to take advantage of the so-called Scheimpflug condition. This relationship, which is set forth in substantial detail in U.S. Pat. No. 751,737, requires that for all possible points of the furnace vessel lining to be focused on the self-scanned linear array elements, the plane including the range of possible points lying on the inner surface of the vessel wall, the plane including the elements of the linear array sensor, and the plane of the focusing lens must intersect along a common line.

Generally, where the inspection system of the present invention must be located some distance from the open top of the furnace vessel, a laser inspection system employing the Scheimpflug condition would be preferred. It will be understood, however, that other types of geometrical relationships may be utilized within the scope of the present invention.

All of the optical components of laser inspection system 300 previously described are fixedly mounted on platform 105. Platform 105 is mounted to an underlying yoke assembly 119. The yoke assembly is fixedly mounted to frame 102 of the cart. Yoke assembly 119 is provided with two orthagonally mounted stepper motors 120 and 121 which control, respectively, movement of the mounting platform 105 in two orthogonal planes. Consequently, by applying the appropriate number of electrical control pulses to stepper motors 120 and 121, platform 105 may be caused to assume any rotational position within its range of motion so as to aim the incident laser beam produced by laser transmitter 107 at a desired location within the furnace vessel. As shown in FIG. 6, stepper motor 120 rotates platform 105 about axis 120a through an angle $\theta$, whereas stepper motor 121 rotates platform 105 about axis 121a through an angle $\beta$. As will be described in more detail hereinafter, by properly controlling stepper motors 120 and 121, the laser beam may be caused to scan over any desired preselected area on the interior vessel lining.

The rear portion of cart 101 is provided with an equipment cabinet including suitably arranged shelves for mounting other equipment associated with the inspection apparatus of the present invention. For example, as illustrated in FIG. 5 and FIG. 9, the inspection apparatus of the present invention also includes a laser power supply 122 for supplying the necessary electrical power to laser transmitter 107, and camera controller 123 comprising the electronics necessary for controlling and processing the information from linear array receiver 109. As will be described in more detail hereinafter, the inspection apparatus also includes a computer for controlling the scan of the laser inspection system and processing the raw data into a utilizable contour map output format, and includes computer 124, a monitor and keyboard 125, and a printer 126. The monitor and keyboard and printer may be accessed by removable panels 127 located on the rear of cart 101.

In order to accurately and repeatably position the inspection apparatus 100 with respect to the furnace vessel so as to provide an accurate reference position from which lining measurements may be made, the present invention is provided with means permanently associated with the platform floor 16 adjacent the opening of the furnace vessel, and means associated with cart 101 which cooperate with the means in the platform floor to fixedly position the cart at a predetermined position with respect to the vessel. In the exemplary embodiment illustrated, these positioning means are provided by positioning pads 128 permanently mounted in platform floor 16 in front of opening 5 of the furnace vessel when the vessel is turned horizontally to its inspection position. A first pad 129, which may be fabricated from hardened steel or other wear resistant material, is mounted in platform floor 16. Pad 129 is preferably provided with a round depression 130 of frustro-conical shape. Pad 129 is spaced from the opening 5 of the furnace vessel so that the laser transmitter and receiver will be positioned at the desired distance from the vessel. Pad 129 is also positioned transversely of the furnace vessel so that the center line 18 of the furnace vessel coincides with the centerline or alignment axis 131 of the laser inspection system 300.

A second locating or positioning pad 132 is located in platform floor 16 on the opposite side of cart 101 at the same distance from the furnace vessel. Locating pad 132 preferably forms an elongated trough-like depression 133 of V-groove shaped cross section. Pad 132 may be fabricated from hardened steel or any other suitable wear resistant material. Generally, it is preferred that pads 129 and 132 be mounted flush or slightly below the upper surface of platform floor 16 so as not to interfere with equipment moving on platform 17. It will be understood that the locating pads may be provided as an integral part of the platform floor, and other shapes and arrangements of pads may be utilized.

Positioning means, shown generally at 134, are also provided on each side of cart 101, as well as centered at the rear of the cart. Construction and operation of each of these positioning means is substantially identical, except where indicated.

Each cart-mounted positioning means 134 comprises a pneumatic cylinder 135 attached to the frame structure of the cart by means of a mounting bracket 136. Pneumatic cylinder 135 is connected to a controllable source of pressurized air or other gas, not shown.

A linearly actuable piston member 137 is vertically disposed beneath each hydraulic cylinder and is guided by a pair of horizontally extending spaced guide brackets 138 having concentrically located openings 139 therethrough. Upper guide bracket 138 also serves as a mechanical stop to limit the extension of piston member 137. Normally, piston member 137 is held in the retracted position as shown in FIG. 5 and FIG. 6 so that the lower end of the piston member is spaced from platform floor 16 a sufficient distance such that the cart can be easily moved about. It will be observed that guide brackets 138 and their accompanying openings 139 are positioned so that the central vertical axis of the side mounted piston members 137 will be exactly located over the center of positioning pads 128 when the cart is in the proper position in front of the horizontally oriented furnace vessel.

In operation, cart 101 is positioned in front of the horizontally disposed furnace vessel so that the hemispherical locating members 140 directly overlie the center of their associated positioning pads 128. The pneumatic cylinder 135 overlying round locating pad 129 is then actuated, driving the associated pneumatic cylinder 135 downwardly until the locating member 140 firmly engages the depression 130 in pad 129. This effectively and accurately locates that side of the inspection apparatus longitudinally and transversely with respect to the center line of the furnace vessel. At the same time, the piston 137 is driven downwardly sufficiently to raise that side of the inspection apparatus cart off of the platform floor 16 so that one side of the cart is accurately positioned vertically with respect to the center line of the furnace vessel.

In a similar manner, the opposite side mounted pneumatic cylinder 135 is actuated driving its associated piston 137 downwardly so that the locating member 140 firmly engages the trough-like depression 133 in the elongated positioning pad 132. In the preferred embodiment, positioning pad 132 is elongated to make it easier to engage the associated locating member within the trough-like depression 133. However, it will be understood that this locating pad may be of the same type construction as round pad 129. At the same time, the piston 137 associated with this side of the cart is driven downwardly a sufficient distance so that the wheels on both sides of the cart are spaced the same distance from the platform floor. This accurately orients the laser inspection apparatus vertically with respect to the center line of the furnace vessel.

Finally, the pneumatic cylinder located near the rear of cart 101 is actuated, driving its associated piston number downwardly so as to raise the rearward end of the inspection apparatus off the platform floor the same distance as the front. Because the front two locating members 140 accurately position the cart, there is no need to provide an additional locating member with respect to the rearward piston member. However, such a locating positioning pad can be provided if desired.

It will be observed that this positioning means accurately aligns the inspection apparatus along all three coordinate axes with respect to the furnace vessel. Moreover, the positioning means ensures that the cart can be positioned in exactly the same location time after time so as to provide an accurate repeatable reference position with respect to the vessel without the need to measure or "shoot" external positions on the furnace vessel or the building structure.

While for purposes of exemplary showing, the pneumatic cylinders 135 have been described as operable independently, it will be understood that all may be operated simultaneously by the closing of a single suitable pneumatic switch. In the preferred embodiment, all piston members 137 will be fully extended to their mechanical limits to orient the inspection apparatus prior to scanning the furnace vessel. However, alternatively, a proportional control may be provided so as to control the amount of extension of any or all of piston embers 137 to provide for irregularities or uneveness in the platform floor 16.

Finally, in some installations it may be impossible or undesirable to align the center line of the furnace vessel with the center line of the laser inspection system. If this should occur, stepper motor 121 may be provided with the appropriate number of control pulses so as to pivot platform 105 and the associated laser inspection system 300 so that the emerging laser beam is directed into opening 5 of the furnace vessel, or the vessel can be tilted oppositely, or both. The processing electronics can then provide a coordinate transformation to take into account the fact that the laser optics are positioned at an angle with respect to the furnace vessel access, rather than being parallel or coaxial with it. It will be understood that this same result can be achieved by tilting the vessel itself with or without reorientation of the laser inspection system.

Figure 10:
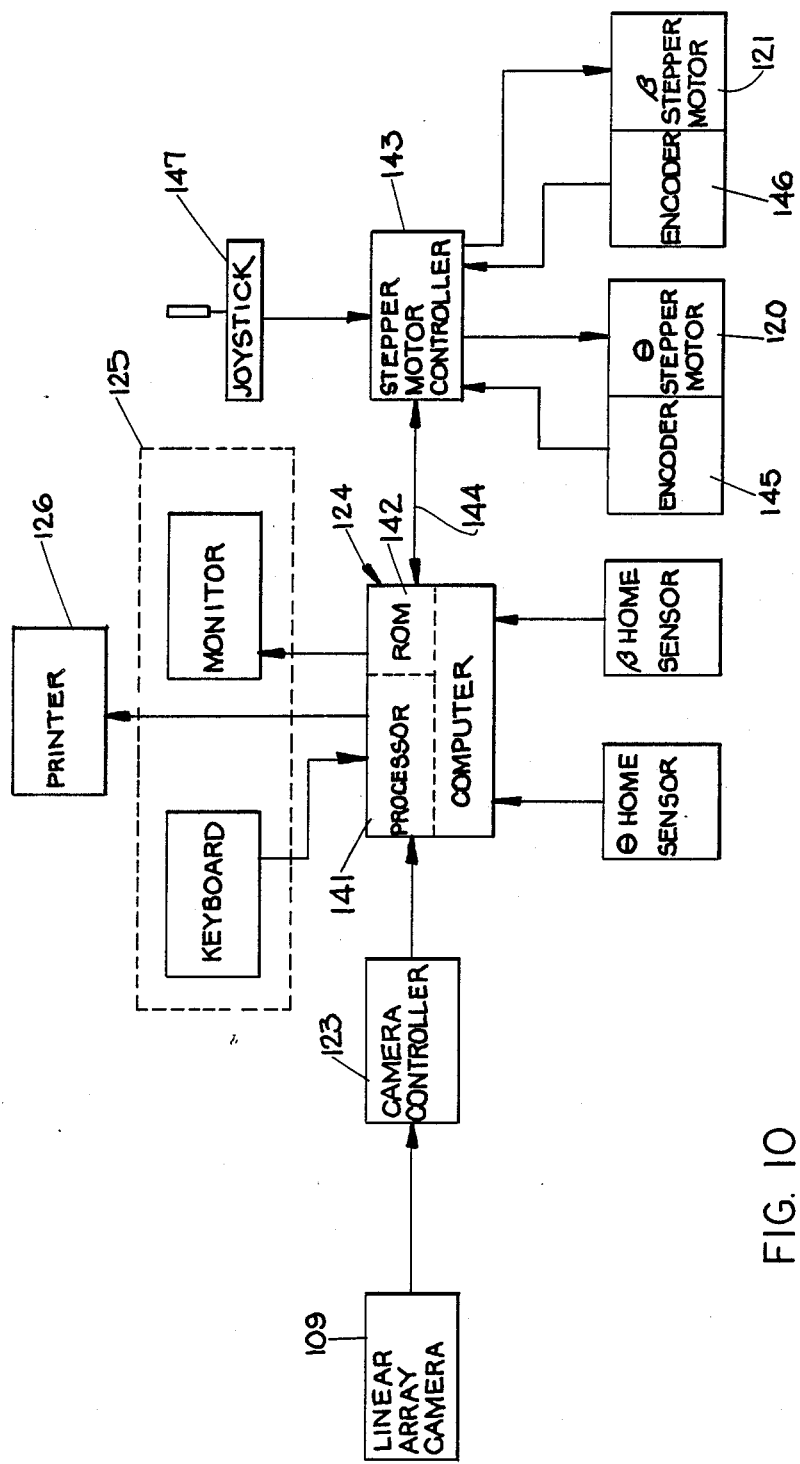
FIG. 10 is a block diagram of the processing means associated with the inspection apparatus of the present invention.

A block diagram of the electronic and electromechanical control for the inspection apparatus of the present invention is illustrated in FIG. 10, where elements previously identified have been similarly designated.

Video information resulting from the scattered laser light beam impinging on the linear array elements 118 of linear array camera 109 is processed by camera controller 123 as described in U.S. application S.N. 560,915, the disclosure of which is incorporated herein by reference. Computer 124 may include a processor 141, such as a microprocessor, and a memory such as ROM (read only memory) 142 for storing a sequence of sequentially executable program instructions for controlling the operation of the inspection system. It will be understood that the program instructions may be stored as firmware in ROM 142. The processing associated with these instructions will be described in detail hereinafter.

Information may be inputted to computer 124 by means of the keyboard, and displayed on a monitor, as previously described in connection with keyboard/monitor 125. Hard copy of the remaining lining thickness profile may be provided from computer 124 by printer 126.

Horizontal stepper motor 120 and vertical stepper motor 121 are under control of a stepper motor controller 143, such as that manufactured by Superior Electric which, in turn, is controlled by output signals from computer 124 on line 144. The actual horizontal position of the laser inspection system is sensed by encoder 145 associated with horizontal stepper motor 120. Position signals from encoder 145 are provided through stepper motor controller 143 as data inputs to computer 124. Similarly, a vertical position encoder 146 associated with vertical stepper motor 121 provides vertical position information through stepper motor controller 143 as input data to computer 124.

Thus, as will be described in more detail hereinafter, after the operator selects a particular area of the interior vessel lining which is to be inspected, computer 124 generates the necessary control signals to cause horizontal stepper motor 120 and vertical stepper motor 121 to position the laser inspection system to the coordinates of each point within the selected area. Feedback position signals from encoders 145 and 146 are inputted to computer 124 to insure that the laser inspection system has, in fact, been moved to the correct coordinates. If desired, however, the positioning control system may be operated "open loop" without reference to feedback position signals from encoders 145 and 146. Also, and if desired, the movement of the laser inspection system may be manually controlled by means of a joystick 147 which supplies the appropriate control signals to stepper motor controller 143 in lieu of those supplied by computer 124 on line 144.

Figure 11A:
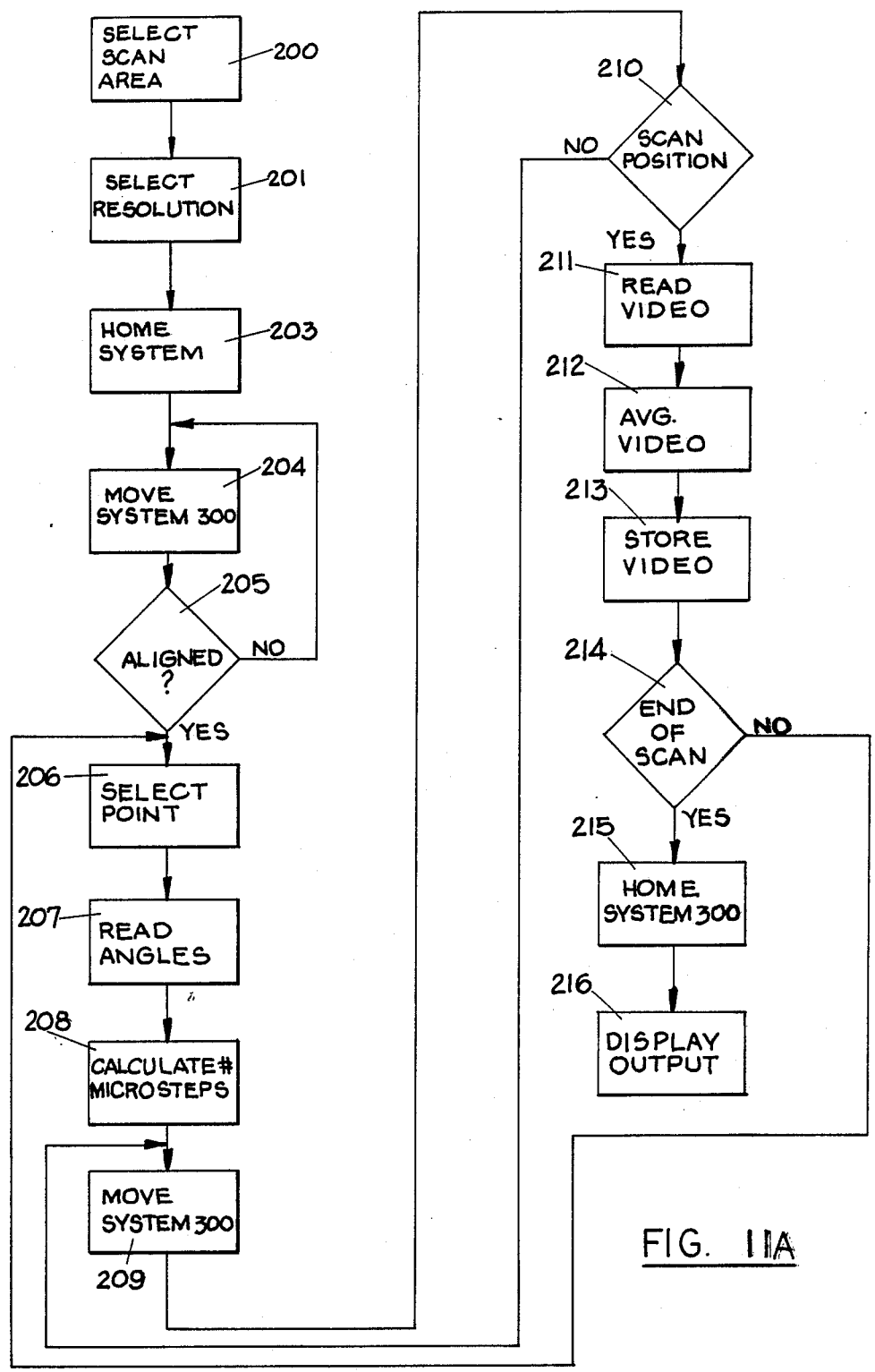
FIGS. 11 A-B depict a flow diagram illustrating the electronic processing associated with the inspection apparatus of the present invention.

The flow processing associated with the program instructions stored in ROM 142 are illustrated diagrammatically in FIG. 11A. The operator first selects in program block 200 the particular portion or area of the interior lining of the vessel which is to be inspected. The operator may elect to scan the entire interior of the furnace vessel accessible by the laser beam through top opening 5. Alternatively, the operator may select to scan a portion of the lining less than the entire area, particularly those areas subject to high wear such as the interior area immediately surrounding the left and right trunnions, the area comprising the charge pad, the area comprising the tap pad, the full bottom and the bottom tuyere areas. Alternatively, the operator may elect to scan only a portion of these areas, or several areas one after the other. In any event, the system will have previously stored data defining the coordinates of points defining each of these predetermined areas. It will be understood that because the size and configuration of furnace vessels vary, the stored coordinates of points defining a particular area may be unique for a particular vessel.

In program block 201, the operator selects the resolution or spacing of points which will define the preselected area. In the preferred embodiment, there is a choice of fine, medium and coarse resolutions. A section of the resolution determines the distance that will separate each of the measured points as the laser beam is scanned within the preselected area.

In program block 203, enclosure 106 containing the laser inspection system 300 is moved to a "home" position, in order to establish a starting reference location. As illustrated in FIG. 10, there is provided in association with system 300 $\theta$ axis home sensor 148 which senses whether system 300 has reached its home position about the $\theta$ axis 120a, and a $\beta$ axis home sensor 149 which determines whether system 300 has reached the home position about the $\beta$ axis 121a. In program blocks 204 and 205, system 300 is continued to be moved by $\theta$ axis stepper motor 120 and $\beta$ axis stepper motor 121 by stepper motor controller 143 and computer 124 until the alignment axis 131 of the laser inspection system 300 is parallel to vessel centerline 18. At that point, system 300 movement is stopped, and processing proceeds as in FIG. 11A.

In program block 206, the first point within the desired area to be scanned is selected and converted to a pair of steering angles $\theta$ and $\beta$ associated with that point in program block 207. The steering angles correspond to the deviation from the home position about the axes 120a and 121a.

In program block 208, each of the steering angles is converted to the number of microsteps necessary to cause stepper motor 120 and stepper motor 121, respectively, to move system 300 to each of the corresponding steering angles $\theta$ and $\beta$. Thereafter, system 300 begins moving to the steering angles defining the first point in the scan in program block 209.

System 300 continues moving until the calculated number of microsteps have been transmitted to the stepper motors. At that point, motion ceases, and encoders 145 and 146 are read by computer 124 to insure the required number of stepper motor microsteps have been completed. The displacement of the received scattered laser beam on the linear array 118 is noted and stored for later conversion to a relative actual remaining lining thickness value as described in application S.N. 560,915, the disclosure of which is incorporated herein by reference. To increase system accuracy, it may be advantageous to average several (e.g., 4) scans from the linear array 118 in order to reduce error caused by perturbations in the scattered laser beam due to momentary convection currents within the hot furnace vessel.

The information corresponding to the actual remaining lining thickness at the particular point under inspection is stored in program block 213. The processing then queries whether the last point in the area to be scanned has been reached. If the last point has not been reached, the next point in the predetermined area is selected, and the foregoing processing repeated to move system 300 to that particular angular position wherein a video reading can be taken.

The foregoing process is completed for each of the points defining the preselected area at the selected resolution until all of the points in the area have been inspected. At this point, the processing branches in program block 214 to return system 300 to the home position at program block 215.

Figure 4:
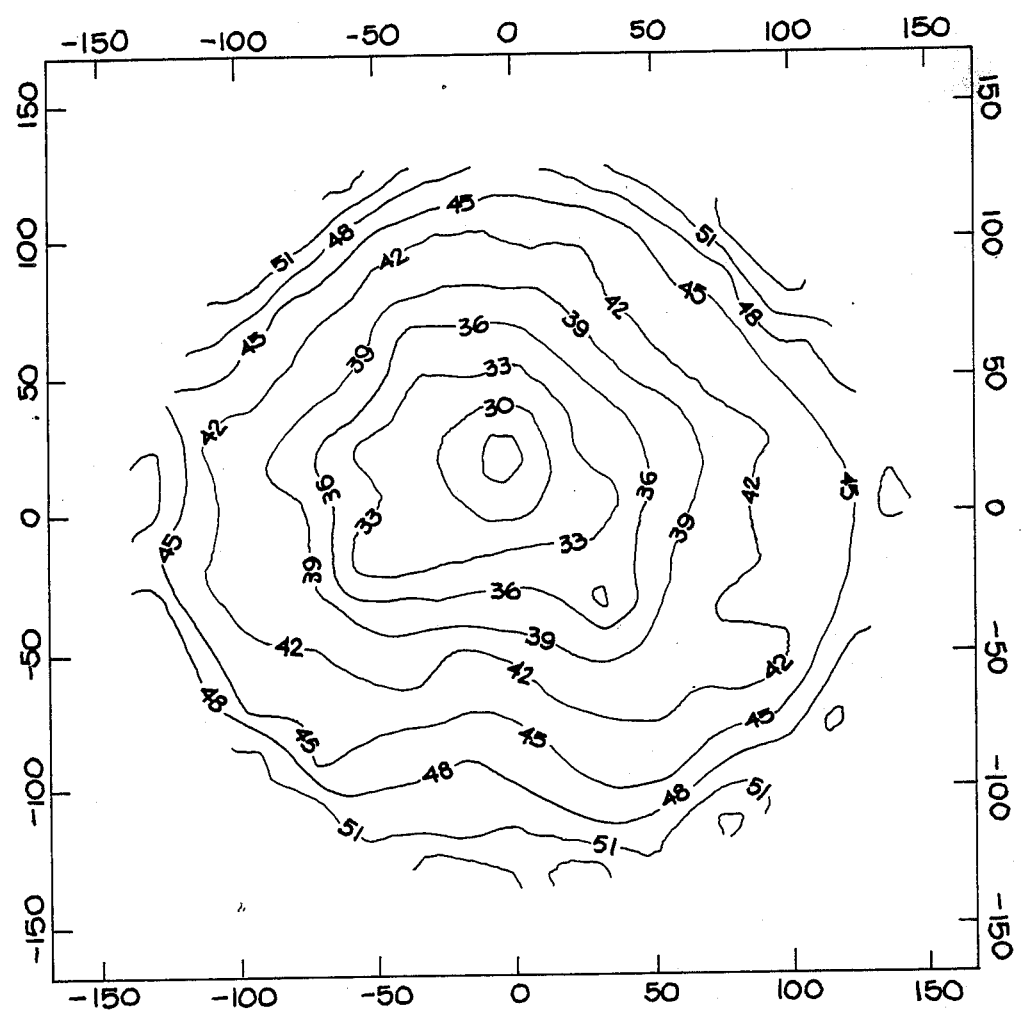
FIG. 4 is a graphical representation of the measured topography for a typical furnace bottom contour plot obtained through the use of the inspection apparatus of the present invention.

Using the stored data accumulated by the foregoing processing, the processing may then create via printer 126 and a conventional software program a contour map, such as that shown in FIG. 4, defining the actual remaining lining thickness within the area just inspected. In this type of plot, regions of equal remaining lining thickness are depicted as a function of position within the furnace vessel. For example, in the exemplary plot shown in FIG. 4, it can be seen that the remaining lining thickness is thinnest at the center of the plot, and increases to as much as 51 inches (1.3m) near the periphery of the area inspected. Utilizing this information, the operator can then decide whether the area requires enhancement with a refractory gunning material, or whether the area should be completely rebuilt.

It will be understood from the processing depicted in FIG. 11A, that any area within the furnace vessel may be defined for inspection. Moreover, the system may be easily modified so that several areas can be serially inspected one after the other.

The processing associated with computer 124 may also be provided with a subroutine to give the molten steel bath height as a function of charge tons. This information is useful for positioning the lower end of the oxygen lance 14 the proper distance above the upper surface of the liquid steel bath to provide a workable lance distance and to prevent breaking or damage to the lance as previously described.

Figure 11B:
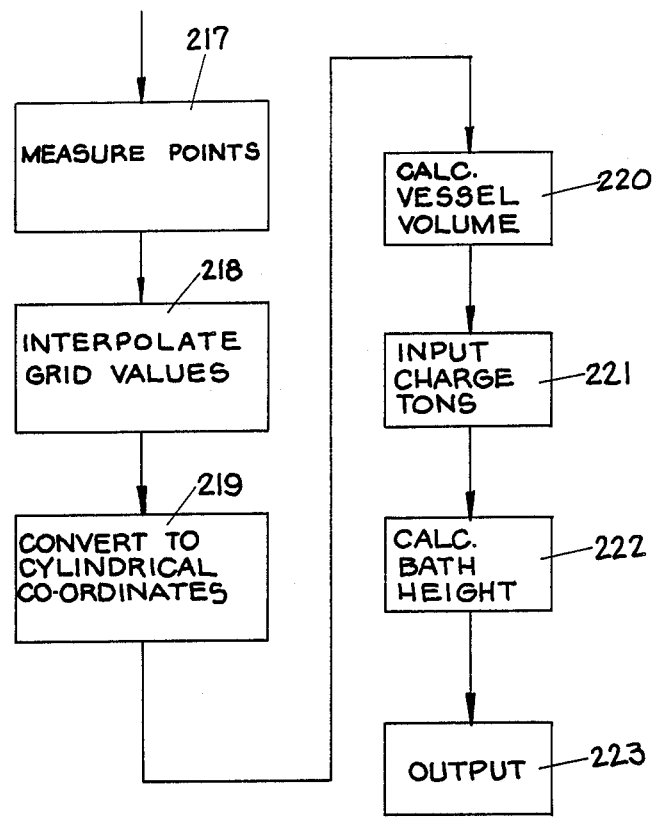
Figure 12:
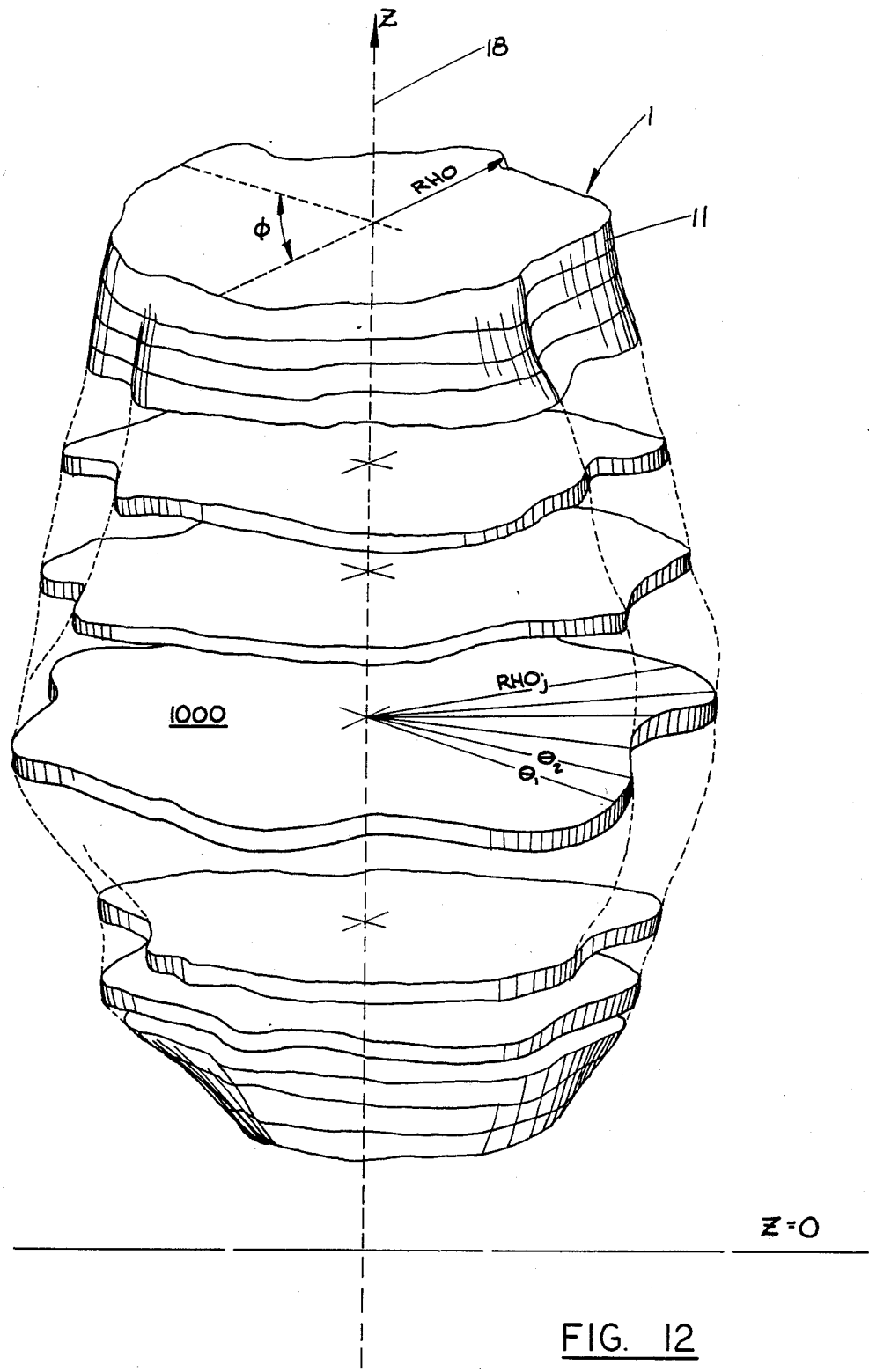
FIG. 12 is a diagrammatic illustration of a typical vessel volume illustrating the method of calculating steel bath height.

In this subroutine as depicted by the flow diagram of FIG. 11B, the points on the interior lining surface of the bottom and barrel sections of the vessel are measured and their angular coordinates stored as previously described in program block 217. As noted, depending upon the measurement resolution selected, each point will be spaced from a neighboring point by a certain distance. In program block 218, the angular coordinates defining each of the actual points are converted to cylindrical coordinates comprising parameters $Z, \phi$, and Rho. As illustrated diagrammatically in FIG. 12, Z is the distance along the central axis 18 of vessel 1. The Z coordinate is defined as zero at the bottom interior surface of the vessel metal shell 9 and increases along the vessel centerline toward vessel opening 5. The parameter $\phi$ is the angular displacement between two points at the same coordinate Z on the lining surface. The parameter Rho is the interior radius of the vessel measured from centerline 18 to a particular point on the lining surface. Together, these parameters define each of the measured points on the inner surface of the lining.

In program block 219, the coordinates of the measured points calculated in block 218 are used to estimate values for RHO for a predetermined grid of $\phi$ and Z values. Various estimation techniques, well known to those skilled in the art, can be used to calculate these estimated values. The number of data points in the estimated grid is generally larger than the number of measured data points to simplify the numerical integration of vessel volume performed in program block 220.

In program block 220, the interior volume of the vessel is calculated up to the maximum height of the steel bath, taking into account the lining topography. The calculation method is illustrated diagrammatically in FIG. 12. This drawing depicts three dimensionally the interior volume of a typical furnace vessel. The volume has been divided along the Z axes into thin slices, such as the intermediate slice shown at 1,000.

To calculate the interior volume of the vessel, the incremental volume of each slice is calculated, and the total volume at a particular height Z within the vessel calculated by adding together the incremental volumes of the slices comprising that volume. For example, with respect to slice 1000, the surface area of the slice is calculated by integrating all values of Rho (designated as $Rho_j$) from $\phi=0$ to $\phi=360°$. The surface area of slice 1000 at the particular value of Z is then multiplied by the thickness of the slice (the incremental value of Z) to obtain the volume of the slice. The volume at a particular height within the vessel is then calculated by adding together the volume of all of the slices from $Z=0$ to that Z value. Such methods of calculating the interior volume using numerical integration techniques are well known to those skilled in the art, and need not be described in detail.

Having calculated the interior vessel volume as a function of Z, the operator inputs the charge tonnage for that particular heat. The processing then calculates the value of Z at which the volume of the vessel equals the volume of the melted charge. This value of Z is the bath height or flat bath level calculated in program block 222.

This information can be displayed in output program block 223 to enable the operator to accurately position the oxygen lance with respect to the upper surface of the molten metal.

In order to maintain the electronic and electromechanical components of the inspection system of the present invention at a safe working temperature, cart 101 is provided with several types of temperature control and moderating provisions. For example, the optics may be provided with a temperature control system such as that described in U.S. application S.N. 560,915. In addition, the laser used in the present invention may be of higher power than that used in U.S. application S.N. 560,915, which will produce a larger waste heat load within the laser transmitter system. This additional heat load within enclosure 106 must be managed. Cooling within the enclosure may be provided by cold nitrogen gas and vortex coolers, and distributed throughout the interior of the enclosure by means of fan 90 mounted on top of the laser transmitter. The exhausted hot nitrogen gas may then be directed through vents (not shown) on the upper surface of enclosure 106.

In addition to the foregoing environmental control measures, the temperature of the cart interior may be reduced by flooding it with a cooling gas such as nitrogen from the same supply used for cooling the laser transmitter. Portions of cart 101, particularly those facing the furnace vessel opening, may also be provided with a suitable pad-like insulation, such as illustrated at 150 in FIG. 6. It will be observed that the insulation has been removed in the other figures for clarity. In addition, openings in the insulation padding may be provided allowing the laser beam to exit opening 111 and the scattered laser beam to enter opening 114. Generally, it will also be desirable to keep the insulation from interfering with moving parts, such as locating pistons 137. Thermostatic control may also be provided to the internal cooling system. By thus carefully maintaining the internal temperature of cart 101 and laser inspection system 300 within safe limits, overheating is avoided, and the cart can be placed very close to the mouth of the hot vessel to maximize the field of view so that the entire barrel and bottom sections of the vessel can be measured from just one location.

The embodiments of the invention which have exclusive property or privileges claimed are as follows:

1. Inspection apparatus for use with a refractory lined vessel of the type having bottom, sides and an open top, the interior walls of said lining being subject to wear and generally at a temperature substantially higher than ambient, said inspection apparatus being configured to measure the actual remaining lining thickness and including:
   a. inspection means comprising:
      i. a laser transmitter for directing a laser light beam toward the interior vessel wall through the vessel opening;
      ii. a receiver for detecting the laser light beam scattered from the interior vessel wall comprising a linear array receiver having a plurality of optical elements positioned in side-by-side relationship;
      iii. means for automatically directing the laser beam sequentially at a plurality of predetermined points on the interior vessel wall comprising a preselected area less than the entire area of the interior vessel wall;
      iv. means for correlating the displacement of the detected laser light beam with respect to said optical elements with the actual remaining lining thickness at each of said points within the preselected area of the interior vessel wall; and
      v. means for accurately and repeatably positioning said inspection means at a predetermined fixed location externally of and adjacent to said vessel.

2. The apparatus according to claim 1 wherein said vessel comprises a furnace vessel and said directing means comprises means for selectively inspecting one or more of the following areas of the vessel lining: left trunnion, right trunnion, charge pad, tap pad, bottom and bottom tuyere.

3. The apparatus according to claim 1 wherein said directing means comprises:
   means for establishing each of the points in the predetermined area;
   means for defining the points as angular coordinates;
   means for moving the laser beam sequentially to each of said angular coordinates; and
   wherein said correlating means includes means for determining the actual remaining lining thickness at each of said points.

4. The apparatus according to claim 3 wherein said directing means comprises a processor operating under control of a plurality of stored instructions.

5. The apparatus according to claim 4 wherein said processor carries out the following steps:
   storing the position of a plurality of points on the inner surface of the vessel within a volume to be defined by a molten steel bath;
   calculating from said points the volume defined within the vessel;
   defining the volume to be occupied by the molten steel charge as a function of its charge weight; and
   calculating from said calculated vessel volume and the defined molten steel volume the height of the molten steel bath within the vessel as a function of charge weight.

6. The apparatus according to claim 1 wherein said directing means comprises a processor operating under control of a plurality of stored instructions.

7. The apparatus according to claim 1 including means for selectively defining the distance between adjacent points.

8. Inspection apparatus for use with a steel making furnace installation of the type having an open-topped furnace vessel moveable between a generally vertical melting position and a non-vertical inspection position and a generally flat platform floor adjacent said vessel, the interior wall of said vessel including a refractory lining subject to wear and generally of a temperature substantially higher than ambient, said inspection apparatus including means for measuring the actual remaining vessel lining thickness comprising:
   a. inspection means including:
      i. a laser transmitter for directing a laser light beam toward the interior vessel wall through the vessel opening;
      ii. a receiver for detecting the laser light beam scattered from the interior vessel wall comprising a linear array receiver having a plurality of optical elements positioned in side-by-side relationship;
      iii. means for correlating the displacement of the detected laser light beam with respect to said optical elements with the actual remaining lining thickness at a particular point on the interior vessel wall;
   b. a portable cart mounting said inspection means and positionable on the platform floor adjacent said vessel opening; and
   c. positioning means for accurately and repeatably positioning said cart with respect to said vessel comprising:
      i. first means associated with the platform floor; and
      ii. second means associated with said cart and configured to cooperate with said first means to fixedly position said cart at a predetermined position with respect to said vessel.

9. A method for determining the actual remaining lining thickness of a steel making furnace vessel of the type having a bottom, sides and open top and a refractory lining subject to wear said method comprising:
   a. accurately and repeatably positioning exteriorly of the vessel inspection apparatus comprising a laser transmitter producing a laser light beam and a receiver for detecting the laser light beam scattered from the interior vessel wall comprising a linear array receiver having a plurality of optical elements positioned in side-by-side relationship;
   b. selecting a plurality of points defining a predetermined area of the interior vessel wall;
   c. determining the coordinates of each of said selected points;
   d. utilizing said coordinates to sequentially and automatically direct said laser beam at each of said selected points within said predetermined area;
   e. detecting the laser light beam scattered from each of said selected points and the amount of displacement of the scattered laser light beam as determined by the particular array elements impinged upon by the beam; and f. correlating the displacement of the detected laser light beam with the actual remaining lining thickness at each of said points.

10. The method according to claim 9 wherein said coordinate determining step includes the step of defining each of said points as a pair of angular coordinates and said directing step comprises directing said laser beam to each of said angular coordinates in turn.

11. The method according to claim 10 wherein said detecting and correlating steps include the step of taking a plurality of readings of the scattered laser light beam at each of said points and averaging said plurality of readings to produce said detected laser light beam.

12. Inspection apparatus for use with a steel making furnace installation of the type having an open-topped furnace vessel moveable between a generally vertical melting position and a non-vertical inspection position and a generally flat platform floor adjacent said vessel, the interior wall of said vessel including a refractory lining subject to wear and generally of a temperature substantially higher than ambient, said inspection apparatus including means for measuring the actual remaining vessel lining thickness comprising:

a. inspection means including:
  i. a laser transmitter for directing a laser light beam toward the interior vessel wall through the vessel opening;
  ii. a receiver for detecting the laser light beam scattered from the interior vessel wall comprising a linear array receiver having a plurality of optical elements positioned in side-by-side relationship;
  iii. means for correlating the displacement of the detected laser light beam with respect to said optical elements with the actual remaining lining thickness at a particular point on the interior vessel wall;
b. a portable cart mounting said inspection means and positionable on the platform floor adjacent said vessel opening; and
c. positioning means for accurately and repeatably positioning said cart with respect to said vessel comprising at least one locating pad permanently associated with the platform floor and a locating means mounted on said cart, said locating means being moveable between a retracted position spaced from the platform floor so that said cart may be moved about and an engaged position wherein said locating means engages said pad to fixedly position said cart at a predetermined position with respect to said vessel.

13. The apparatus according to claim 12 wherein said locating means comprises a piston having its lowermost end configured to engage said pad and a fluid actuated cylinder for moving said piston between the retracted and engaged positions.

14. The apparatus according to claim 13 wherein the lowermost end of said piston is of hemispherical-like shape and said pad contains a cooperating depression for accepting the lowermost end of said piston.

15. The apparatus according to claim 14 wherein said pad is elongated and positioned transverse to the central axis of the furnace vessel.

16. The apparatus according to claim 13 including means associated with said locating means for elevating the cart with respect to the platform floor.

17. Inspection apparatus for use with a steel making furnace installation of the type having an open-topped furnace vessel moveable between a generally vertical melting position and a non-vertical inspection position and a generally flat platform floor adjacent said vessel, the interior wall of said vessel including a refractory lining subject to wear and generally of a temperature substantially higher than ambient, said inspection apparatus including means for measuring the actual remaining vessel lining thickness comprising:

a. inspection means including:
  i. a laser transmitter for directing a laser light beam toward the interior vessel wall through the vessel opening;
  ii. a receiver for detecting the laser light beam scattered from the interior vessel wall comprising a linear array receiver having a plurality of optical elements positioned in side-by-side relationship;
  iii. means for correlating the displacement of the detected laser light beam with respect to said optical elements with the actual remaining lining thickness at a particular point on the interior vessel wall;
b. a portable cart mounting said inspection means and positionable on the platform floor adjacent said vessel opening; and
c. positioning means for accurately and repeatably positioning said cart with respect to said vessel comprising a pair of spaced apart locating pads permanently associated with the platform floor and a pair of locating means affixed to the sides of the cart and moveable between a retracted position spaced from the platform floor so that the cart may be moved about and an engaged position wherein each of said locating means engages a respective one of said pads to fixedly position said cart at a predetermined position with respect to said vessel.

18. The apparatus according to claim 17 wherein said locating means comprises a piston having its lowermost end configured to engage said pad and a fluid actuated cylinder for moving said piston between the retracted and engaged positions.

19. The apparatus according to claim 18 wherein the lowermost end of said piston is of hemispherical-like shape and said pad contains a cooperating depression for accepting the lowermost end of said piston.

20. The apparatus according to claim 19 wherein one of said pads is rounded and the other of said pads is elongated and positioned transverse to the central axis of the furnace vessel.

21. The apparatus according to claim 18 including means associated with said locating means for elevating the cart with respect to the platform floor.

22. The apparatus according to claim 21 including a third piston and cylinder positioned at the rear of the cart for elevating the cart with respect to the platform floor.

23. The apparatus according to claim 22 wherein all of said cylinders are actuated simultaneously so as to locate and elevate the cart with respect to the furnace vessel.

24. The apparatus according to claim 17 wherein said pads are positioned substantially the same distance from the vessel opening.

25. Inspection apparatus for use with a steel making furnace installation of the type having an open-topped furnace vessel moveable between a generally vertical melting position and a non-vertical inspection position and a generally flat platform floor adjacent said vessel, the interior wall of said vessel including a refractory lining subject to wear and generally of a temperature substantially higher than ambient, said inspection apparatus including means for measuring the actual remaining vessel lining thickness comprising:
   a. inspection means including:
      i. a laser transmitter for directing a laser light beam toward the interior vessel wall through the vessel opening;
      ii. a receiver for detecting the laser light beam scattered from the interior vessel wall comprising a linear array receiver having a plurality of optical elements positioned in side-by-side relationship;
      iii. means for correlating the displacement of the detected laser light beam with respect to said optical elements with the acutal remaining lining thickness at a particular point on the interior vessel wall;
   b. a portable cart mounting said inspection means and positionable on the platform floor adjacent said vessel opening; and
   c. positioning means for accurately and repeatably positioning said cart with respect to said vessel comprising:
      i. first means associated with the platform floor; and
      ii. second means associated with said cart and configured to cooperate with said first means to fixedly position said cart at a predetermined position with respect to said vessel and to position said cart vertically.

26. Inspection apparatus for use with a steel making furnace installation of the type having an open-topped furnace vessel moveable between a generally vertical melting position and a non-vertical inspection position and a generally flat platform floor adjacent said vessel, the interior wall of said vessel including a refractory lining subject to wear and generally of a temperature substantially higher than ambient, said inspection apparatus including means for measuring the actual remaining vessel lining thickness comprising:
   a. inspection means including:
      i. a laser transmitter for directing a laser light beam toward the interior vessel wall through the vessel opening;
      ii. a receiver for detecting the laser light beam scattered from the interior vessel wall comprising a linear array receiver having a plurality of optical elements positioned in side-by-side relationship;
      iii. means for correlating the displacement of the detected laser light beam with respect to said optical elements with the actual remaining lining thickness at a particular point on the interior vessel wall;
   b. a portable cart mounting said inspection means and positionable on the platform floor adjacent said vessel opening; and
   c. positioning means for accurately and repeatably positioning said cart with respect to said vessel comprising a pair of spaced apart locating pads permanently associated with the platform floor and a fluid actuated cylinder associated with each side of the cart and a piston operable by each of said cylinders between a retracted position spaced from the platform floor and an engaged position wherein the lowermost end of each of said pistons engages a respective one of said pads, each of said pads containing a cooperating depression for accepting the lowermost end of its associated piston, one of said pads being elongated and positioned transversely to the central axis of the furnace vessel, said pads being positioned substantially the same distance from the vessel opening.

27. The apparatus according to claim 26 including a third piston and cylinder positioned at the rear of the cart, each of said pistons being moveable to the engaged position so as to elevate the cart vertically for aligning the inspection apparatus with the furnace vessel.

* * * * *